United States Patent
Zou et al.

(10) Patent No.: US 8,124,254 B2
(45) Date of Patent: Feb. 28, 2012

(54) HETEROSTRUCTURE OF FERROMAGNETIC AND FERROELECTRIC MATERIALS WITH MAGNETO-OPTIC AND ELECTRO-OPTIC EFFECTS

(75) Inventors: Yingyin Kevin Zou, Lexington, MA (US); Hua Jiang, Sharon, MA (US); Kewen Kevin Li, Andover, MA (US); Xiaomei Guo, West Roxbury, MA (US)

(73) Assignee: Boston Applied Technologies, Inc, Woburn, MA (US)

( * ) Notice: Subject to any disclaimer, the term of this patent is extended or adjusted under 35 U.S.C. 154(b) by 157 days.

(21) Appl. No.: 12/002,585

(22) Filed: Dec. 18, 2007

(65) Prior Publication Data
US 2008/0145693 A1 Jun. 19, 2008

Related U.S. Application Data

(60) Provisional application No. 60/875,677, filed on Dec. 19, 2006.

(51) Int. Cl.
*G11B 5/66* (2006.01)

(52) U.S. Cl. ............ 428/817; 360/131; 365/64; 365/65; 365/66; 365/145

(58) Field of Classification Search ........ 428/800–848.9
See application file for complete search history.

(56) References Cited

U.S. PATENT DOCUMENTS

| | | | | |
|---|---|---|---|---|
| 5,985,472 A * | 11/1999 | Geho et al. | | 428/800 |
| 6,055,215 A * | 4/2000 | Katsuragawa | | 369/13.35 |
| 6,063,304 A * | 5/2000 | Fujii et al. | | 252/62.57 |
| 6,498,549 B1 * | 12/2002 | Jiang et al. | | 333/202 |
| 6,746,618 B2 | 6/2004 | Li et al. | | |
| 6,785,037 B2 | 8/2004 | Matsushuta et al. | | |
| 6,890,874 B1 | 5/2005 | Li et al. | | |
| 7,498,720 B2 * | 3/2009 | Loebl et al. | | 310/335 |
| 2005/0094678 A1 * | 5/2005 | Zou et al. | | 372/12 |
| 2005/0288813 A1 * | 12/2005 | Yang et al. | | 700/119 |
| 2007/0138459 A1 | 6/2007 | Wong et al. | | |
| 2007/0252593 A1 | 11/2007 | Takeuchi et al. | | |

OTHER PUBLICATIONS

Zhu et al, Effect of lanthanum-doping on the dielectric and piezoelectric properties of PZN-based MPB composition, 2001, Kluwer Academic Publishers, Journal of Materials Science, 4089-4098.*
M.I.Bichurin, et al., "Theory of low-frequency magnetoelectric coupling in magnetostrictive-piezoelectric bilayers,"Phys. Rev. B68, 054402 (2003).
G.Srinivasan, et al., "Magnetoelectric effects in ferrite-lead zirconate titanate layered composites: The influence of zinc substitution in ferrites," Phys. Rev. B67, 014418 (2003).
S.Shastry, et al., "Microwave magnetoelectric effects in single crystal bilayers of yttrium iron garnet and lead magnesium niobate-lead titanate," Phys. Rev. B70, 064416 (2004).
W. Eerenstein, et al., "Multiferroic and magnetoelectric materials," Nature, vol. 442, p. 759, Aug. 17, 2006.
Xiaomei Guo, et al., "Formation of multiferroic thin-film heterostructure (BiAI:YIG/La:PMNT) via a wet chemical process," J. Mater. Res., vol. 22, No. 8, p. 2125, Aug. 2007.

* cited by examiner

*Primary Examiner* — Holly Rickman
*Assistant Examiner* — Linda Chau

(57) ABSTRACT

A heterostructure of multiferroics or magnetoelectrics (ME) was disclosed. The film has both ferromagnetic and ferroelectric properties, as well as magneto-optic (MO) and electro-optic (EO) properties. Oxide buffer layers were employed to allow grown a cracking-free heterostructure a solution coating method.

6 Claims, 7 Drawing Sheets

HETEROSTRUCTURE OF FERROMAGNETIC AND FERROELECTRIC MATERIALS WITH MAGNETO-OPTIC AND ELECTRO-OPTIC EFFECTS

CROSS REFERENCE TO RELATED APPLICATION

This application claims the benefit of Provisional Patent Application Ser. No. 60/875,677 filed on Dec. 19, 2006.

STATEMENT OF GOVERNMENTAL INTEREST

This invention was made with Government support, in whole or in part, under a NASA grant no. NNG04CB08C, NSF grants DMI-0422094 and DMI-0522177. The government has certain rights in this invention.

BACKGROUND OF THE INVENTION

1. Technical Field

The present invention relates to a magnetoelectric heterostructure, which consists of a ferromagnetic layer and a ferroelectric layer with some buffer layers in between. And more particular a magnetoelectric heterostructure with magneto-optic and electro-optic effects. It is also related to a method to fabricate the magnetoelectric heterostructure.

2. Technical Background

Interest in multiferroic materials combining two or more ferroic properties, especially ferroelectric and ferromagnetic properties, has inspired a flurry of research activities in recent years due to a great expectation of potential applications in the microelectronics field. Aside from the applications of both ferroelectric (FE) and ferromagnetic (FM) properties, the magnetoelectrics effect can be used in multiple-state memory elements, in which data is stored both in the electric and the magnetic polarizations, or magnetoelectric signal processing devices, such as an FMR-based phase shifters and filters.

The magnetoelectric (ME) effect is defined as the dielectric polarization of a material in an applied magnetic field or an induced magnetization in an external electric field. The effect, first observed in antiferro-magnetic $Cr_2O_3$, is weak in single-phase compounds. Promising single-phase multiferroic materials, such as $BiFeO_3$, $TbMnO_3$, and $YMnO_3$, have been found, and their modified derivatives have been extensively investigated. However, there are still very few applicable magnetic ferroelectric materials discovered so far, and their multiferroic effects are not significant enough to be useful in practical applications.

An alternative is to form multiphase complexes, e.g., composites or multilayer structures, in which each phase exhibits a strong ferroic property. To date, in most research, multilayer or bilayer multiferroic structures are laminated and sintered together, or bonded by silver epoxy. In such circumstances, strains and inhomogeneities at the interfaces, or the existence of a foreign layer, complicate the understanding of the important magnetic-electric coupling phenomenon. In contrast, epitaxial multilayer films are more desirable for both theoretical studies and potential applications since there are many factors such as layer thickness and interfacial roughness that may be accurately controlled.

On the other hand, both magneto-optic (MO) and electro-optic (EO) effects are widely used in optical industry. Current photonic integrated circuits (PICs) are based on either polymer or $SiO_2$ films that are limited in device functionality. Electro-optic or magneto-optic materials are very attractive in adding functionality and adaptivity to PICs. However, very limited work has been done on PICs with functional materials. In this invention, we have developed a multifunctional thin film structure with MO and EO effects, which would enable the integration of MO isolators with other monolithic optical devices, such as lasers, waveguides, modulators, and detectors.

SUMMARY OF THE INVENTION

One aspect of the invention relates to a multiferroic heterostructure comprising a ferromagnetic layer and a ferroelectric layer, therefore with both ferromagnet and ferroelectric properties.

Another aspect of the invention relates to a multiferroic heterostructure constituted of a ferromagnetic layer which has a magneto-optic effect, and a ferroelectric layer which has a electro-optic effect.

Another aspect of the invention relates to a proper buffer layer for cracking-free heterostructure film fabrication.

Yet another aspect of the invention relates to a solution coating method to fabricate the said multiferroic heterostructure.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings are not necessarily to scale. The drawings illustrate one or more embodiment(s) of the invention, and together with the description serve to explain the principles and operations of the invention.

DETAILED DESCRIPTION OF THE PREFERRED EMBODIMENTS

Figure 1:
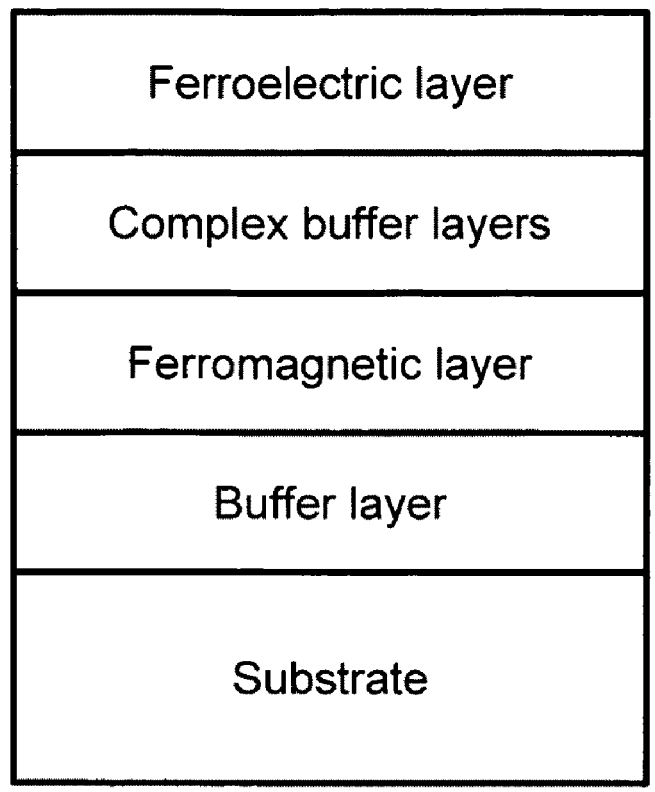
FIG. 1 is a schematic diagram illustrating of the multiferroic heterostructure in accordance with the present invention.

Shown in FIG. 1 is a preferred embodiment according to present invention. The heterostructure is consisted of a substrate, a buffer layer on the substrate, a ferromagnetic layer, a complex buffer layer and a ferroelectric layer.

In one of the preferred embodiment, c-sapphire was used as the substrate. The ferromagnetic thin film layer, which is also a magneto-optic layer, is bismuth and aluminum substituted yttrium iron garnet, or BiAl:YIG. One of the preferred compositions is $Bi_{1.8}Y_{1.2}Fe_{4.2}Al_{0.8}O_{12}$. Undoped yttrium iron garnet (YIG) or other doping elements, such as, but not limited to, Tb, Ga, Al, Ce, and Ge can also be incorporated into the YIG. The ferroelectric thin film layer, which is also an electro-optic layer, is lanthanum modified $Pb(Mg_{1/3}Nb_{2/3})O_3$—$PbTiO_3$ (La:PMNT or PLMNT). Other electro-optic materials, such as La modified PBZNT, lanthanum-doped lead zirconate titanate (PLZT) or BST can also be used as the ferroelectric thin film layer.

Several buffer layers were incorporated into the heterostructure to prevent the cracking problem by reducing the stress between substrates and films. An appropriate buffer layer can also protect the substrate at high deposition temperature and improve the substrate/film interfaces. Magnesium oxide (MgO) is a good candidate for a buffer because it is chemically stable and its lattice constant matches to that of both YIG and PLMNT, as well as to that of the sapphire substrates (a=4.758 Å, c=12.991 Å). MgO has a cubic structure and its lattice constant is 4.216 Å, three times of which would match that of YIG (a=12.38 Å), and very close to that of PLMNT (~4.12 Å). The coefficient of thermal expansion (CTE) of MgO is $10.8 \times 10^{-6}/°$ C. at 0° C., $8.0 \times 10^{-6}/°$ C. at 100° C. It matches well with sapphire's (7.9 to $8.8 \times 10^{-6}/°$ C.) and YIG's CTE ($8.13 \times 10^{-6}/°$ C.). We used MgO as buffer and found it works perfectly to help growing both YIG and PLMNT films.

Indium Tin Oxide (ITO) is another good buffer candidate for growing YIG and PLMNT films on a sapphire substrate, especially when a conductive layer is desired. The CTE of ITO is $8.5 \times 10^{-6}/°$ C., lattice constant is about 10.2 Å.

A complex buffer, which comprises MgO, lanthanum-doped lead titanate (PLT), and lanthanum-doped lead zirconate titanate (PLZT), has been developed in this invention especially for the growth of PLMNT onto BiAl:YIG layer.

Figure 2:
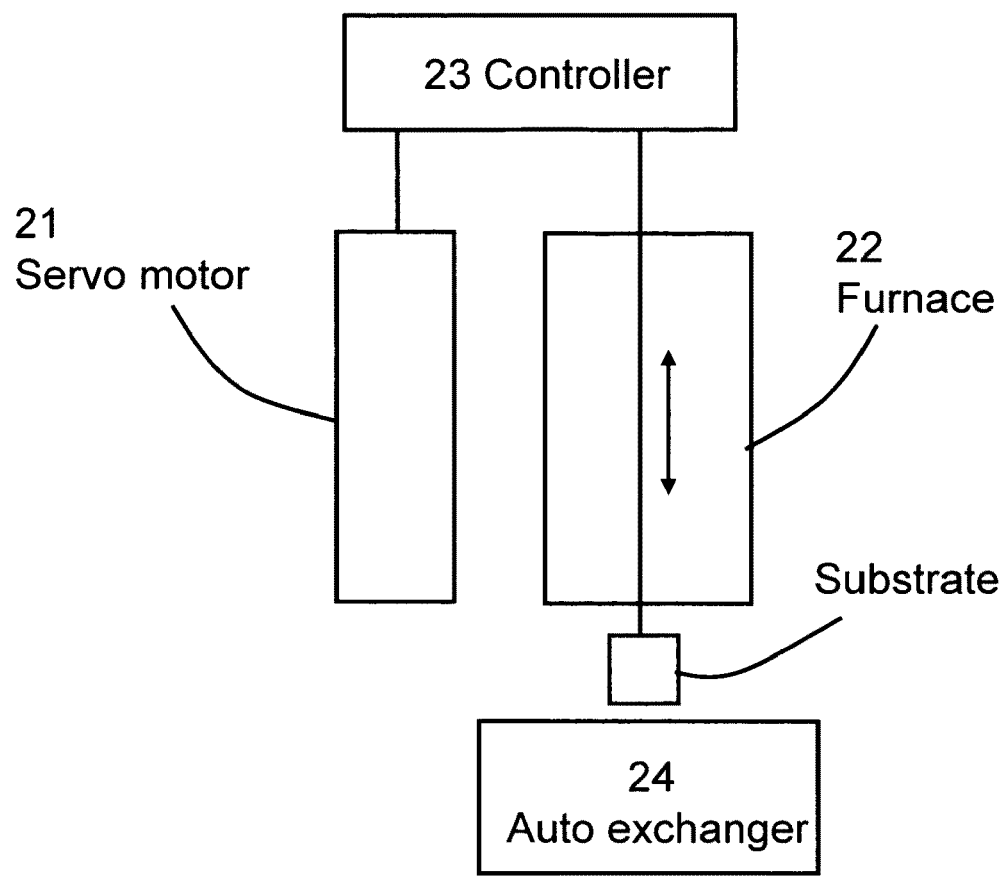
FIG. 2 is a schematic illustration of the solution coating apparatus used for fabricating the multiferroic heterostructure in this invention.

The film was fabricated by a solution coating method. The coating apparatus used for coating films in this invention are shown schematically in FIG. 2. It consists of three major parts: a driving mechanism 21, a vertical tube furnace 22, and a computerized controller 23. This apparatus is capable of multiple cycles that consist of immersing, withdrawing, drying, annealing and cooling stages. The number of cycles, the number of stages in a cycle and the motion and/or duration of each stage can all be programmed into the computer. The system is also equipped with an automated exchanger 24 for solutions of different precursors. A unique advantage of the coating process is that it can be used to grow multilayer (or superlattice) materials conveniently by dipping the substrate into different chemical precursors each time.

In this technique, solutions of individual metal-organic compounds are mixed at the desired cation ratios to form a coating solution. This coating solution is deposited on a substrate by dip-coating to produce a wet film, which is then heated to first remove any solvent that did not evaporate during the deposition step and then to decompose the metal-organic compounds to produce an inorganic film. For most applications, the first consideration for an adequate film forming process is the ability to produce a final crack-free film. Solution-derived films tend to form cracks with increasing thickness owing to the high volume shrinkage as organic materials are removed during the firing process. This is especially true for films requiring a high-temperature treatment for crystallization. Not only is there another volume shrinkage accompanying the amorphous-to-crystalline transformation but factors like thermal expansion mismatch between the film and the substrate also become more severe as the processing temperature increases.

A similar solution coating method is spin-coating.

Figure 3:
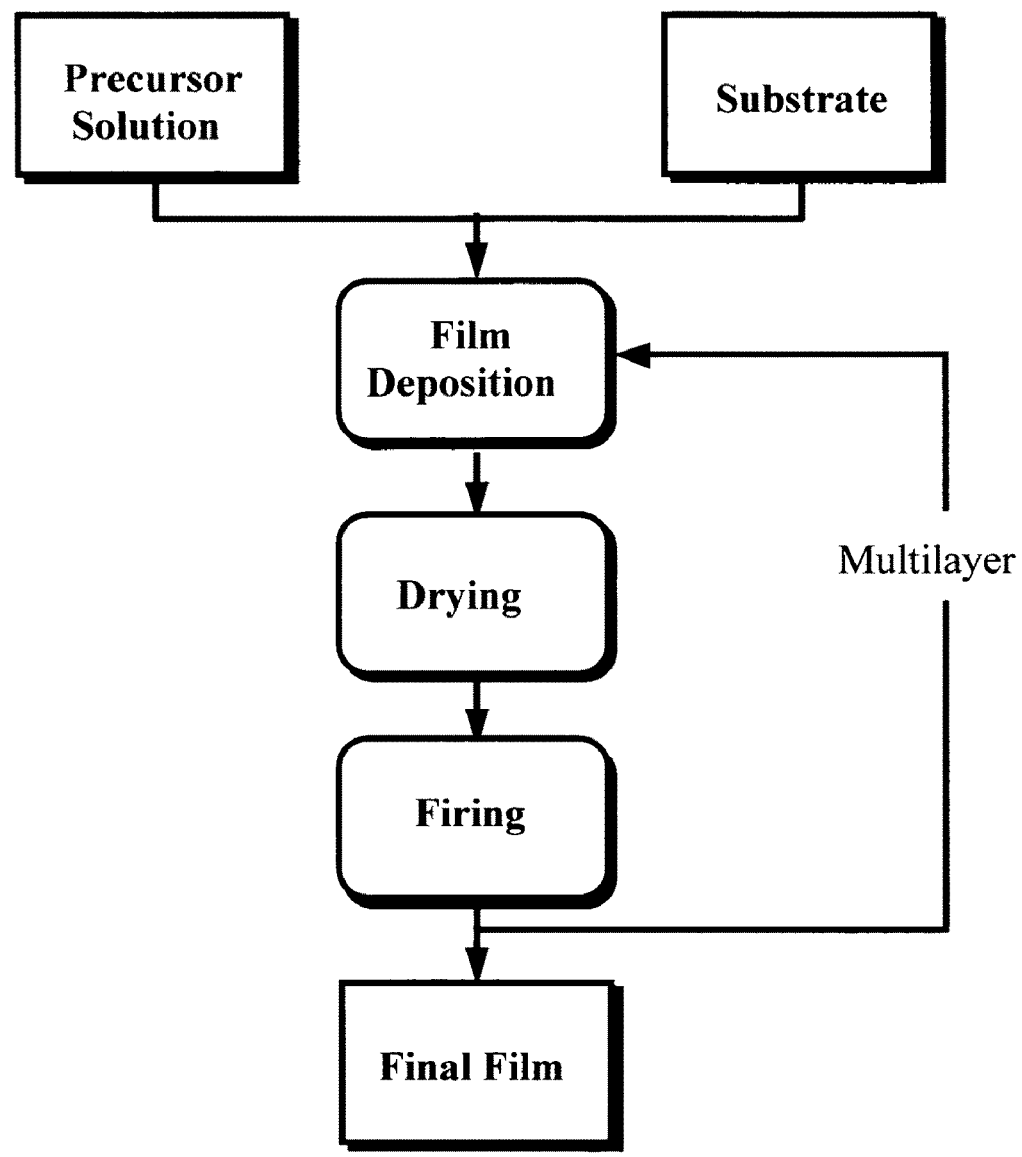
FIG. 3 is a flow chart explaining a process of manufacturing the films.

A typical flow chart for preparing crystalline films from solutions by multiple dipping is shown in FIG. 3. The temperature cycling nature of the solution coating process (by repeated heating and cooling for each layer) significantly reduces the stress due to thermal expansion mismatch between the substrate and film materials.

Precursors for preparing the garnet FM films were all nitrate compounds ($Y(NO_3)_3$, $Fe(NO_3)_3$, $Al(NO_3)_3$ and $Bi(NO_3)_3$). Nitrates (~10 g in total according to the desired cation ratios) were first dissolved into 30 mL acetylacetone (2,4-pentanedione). Ethanol (30-50 mL) was then added to a desired level for the subsequent coating process. The solutions were aged overnight prior to coating. The cracking-free film is up to the thickness of 3 µm.

For PLMNT films and PLT or PLZT buffers, the precursors in the forms of acetates and alkoxides were dissolved in methanol and 2-methoxyethanol after proper dehydration. Magnesium acetate, dissolved in 2-methoxyethanol, was used as the precursor for MgO. Concentrations of the various solutions were between 0.1 and 0.4 M (mol/L). The cracking-free film is up to the thickness of 3 µm.

The on site heating temperature used to crystallize the film is in the range of 500-800° C. The dipping speed is 1-2 mm/second. The firing times are around 2-3 minutes. The firing speed is about 3 mm/second. The precursors for the PLMNT film and PLT and PLZT buffers are made of all acetates (except niobium ethoxide) dissolved in methanol and 2-methoxyethanol. The precursor for MgO solution is magnesium acetate solved in 2-methoxyethanol. Concentrations of the solutions are between 0.2-0.4 M (mol/L).

Figure 4:
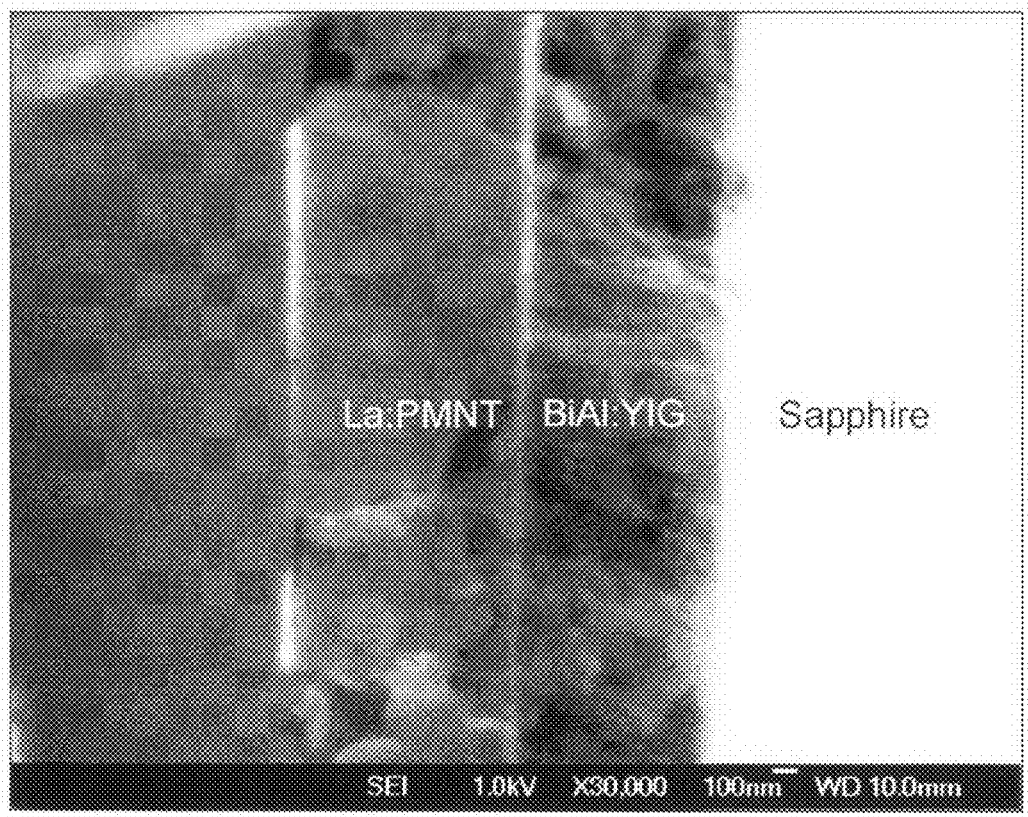
FIG. 4 is a cross-section SEM image of a multiferroic heterostructure film.

The heterostructure film exhibits excellent optical qualities with smooth surfaces and high transparency. Scanning electron microscopy (SEM, JEOL 6320, Peabody, Mass.) was used to examine the morphologies of the heterostructure films. FIG. 4 is the SEM image of the cross section. (The film and substrate were cleaved by a diamond knife without further polishing.) It can be seen that the multilayer structure is well formed. The thicknesses of the ferromagnetic layer and the ferroelectric layer are about 800 and 900 nm, respectively. The thicknesses of the individual buffer layers (shown as the white lines) are in the range of 5 to 20 nm.

Figure 5:
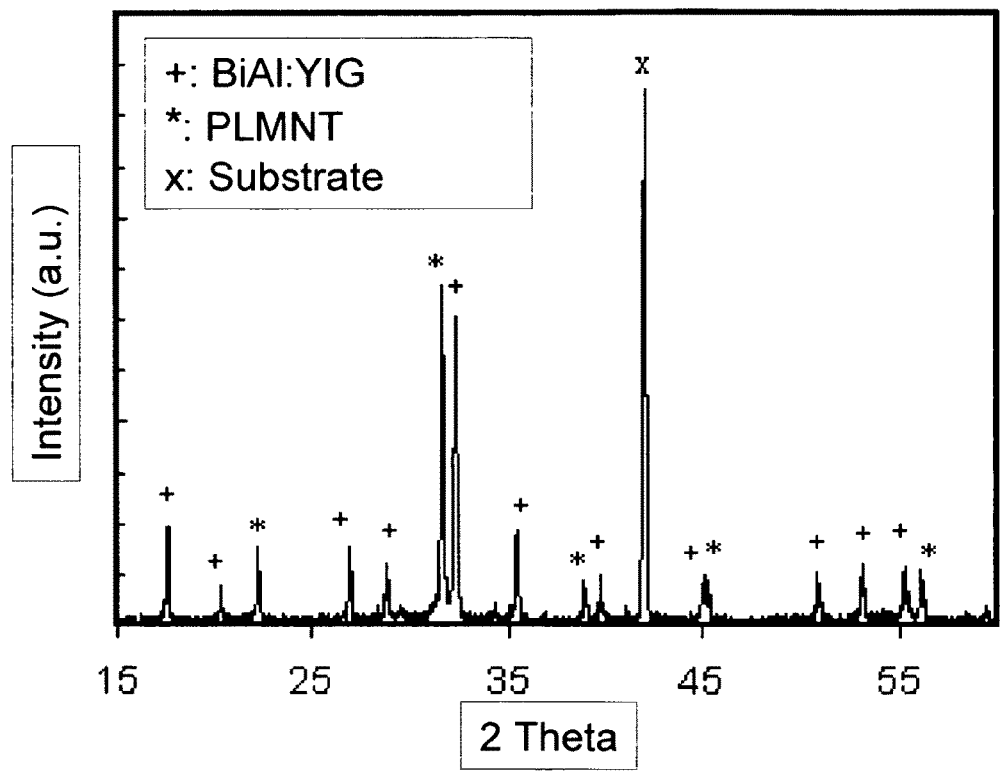
FIG. 5 is showing a typical XRD spectrum of a multiferroic heterostructure film.
Figure 6:
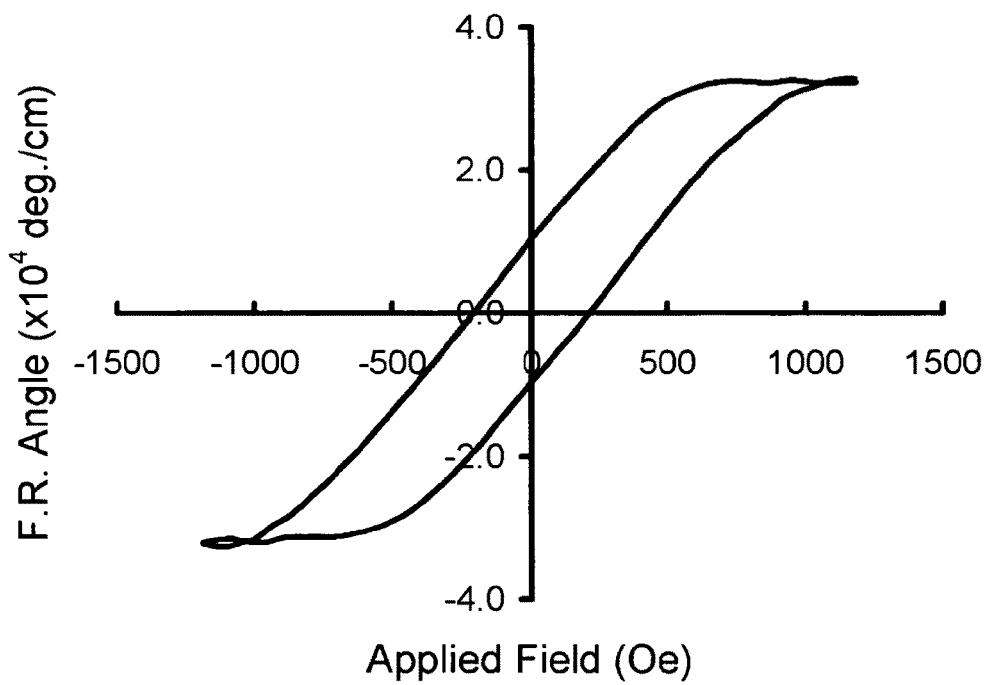
FIG. 6 is showing a typical Faraday rotation curves of the multiferroic heterostructure film.
Figure 7:
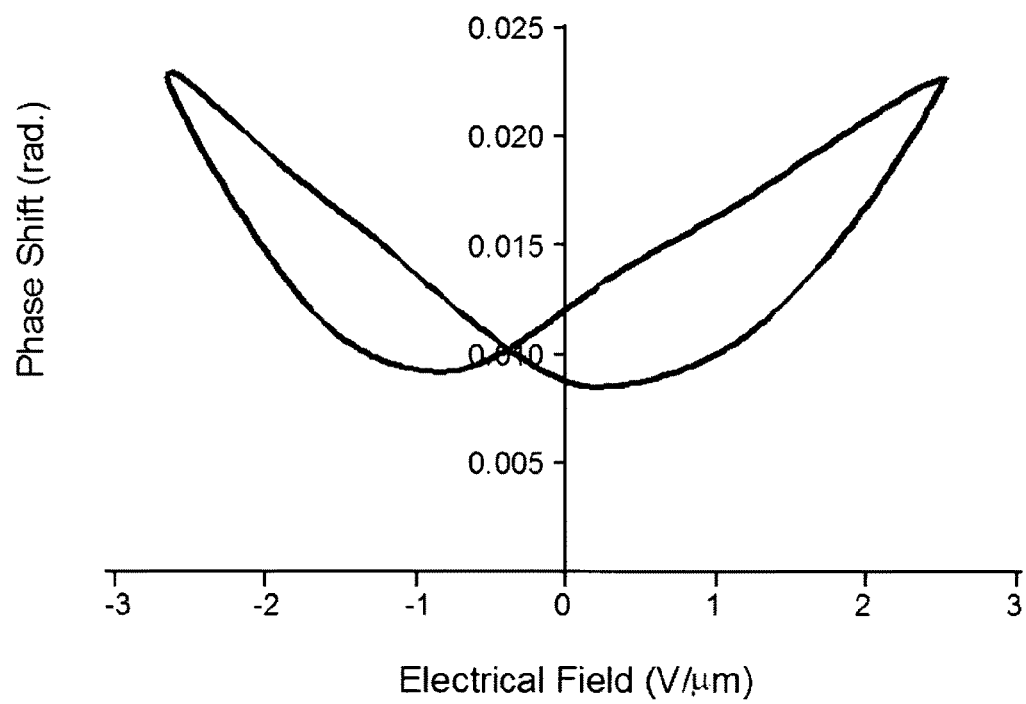
FIG. 7 is showing a typical EO effect curve of the multiferroic heterostructure film.

Crystallinity of the heterostructure was characterized using a Rigaku (Rigaku Americas Corp., The Woodlands, Tex.) x-ray diffractometer (XRD) system. FIG. 5 shows the XRD pattern of the heterostructure. Both garnet (BiAl:YIG) and perovskite (PLMNT) crystalline structures are well formed. The heterostructure exhibits both ferromagnetic and ferroelectric effects as illustrated in FIGS. 6 and 7. The ferromagnetic and magneto-optic effects of the BiAl:YIG layer were not negatively affected by the existence of the ferroelectric layer. Shown in FIG. 6 is the Faraday rotation curve of a heterostructure film. The heterostructure film has a Verdet constant as high as 4.5°/mm-Oe at the wavelength of 633 nm, which is higher than that of the referenced single BiAl:YIG film at 2.7°/mm-Oe. Shown in FIG. 7 is measured EO coefficient of the heterostructure at 532 nm. The EO coefficient is about $0.3 \times 10^{-16}$ $(m/V)^2$, which is significantly higher comparing to that of other EO films.

Although particular embodiments of the invention have been described and illustrated herein, it is recognized that modifications and variations may readily occur to those skilled in the art. For example, other film fabrication technologies can be used to make the structure, or different precursor can be used in a solution coating method. The thickness of any layer can be changed. To enhance the ferromagnetic and ferroelectric effects of the individual layer, periodic multilayer structures can be further incorporated into the heterostructure multiferroic film.

What is claimed is:

1. A heterostructure of ferromagnetic and ferroelectric materials, comprising:
   a substrate including c-sapphire;
   a ferromagnetic thin film layer including bismuth and aluminum substituted yttrium iron garnet (BiAl:YIG);
   a ferroelectric thin film layer including PLMNT;
   a buffer layer, including indium tin oxide (ITO), between the substrate and the ferromagnetic layer; and
   a complex buffer layer, including magnesium oxide (MgO), lanthanum-doped lead titanate (PLT), and lanthanum-doped lead zirconate titanate (PLZT), between the ferromagnetic layer and the ferroelectric layer.

2. The heterostructure of claim 1, wherein the ferromagnetic thin film layer has a creaking-free thickness up to 3 μm.

3. The buffer layer in claim 1 has a thickness from 5 to 20 nm.

4. The heterostructure film in claim 1 has a magneto-optic effect and electro-optic effect, whereas the magneto-optic effect has a Verdet constant of about 4.5°/mm-Oe at a wavelength of 633 nm for a 800 nm thick YIG layer, and whereas the electro-optic effect has an EO coefficient of about $0.3 \times 10^{-16}$ $(m/V)^2$ for a 900 nm thick PLMNT layer.

5. The heterostructure film as recited in claim 1, wherein the ferromagnetic layer further comprises Ce.

6. The heterostructure as recited in claim 1, wherein the complex buffer layer further comprises ITO.

* * * * *